(12) United States Patent
Goodwin et al.

(10) Patent No.: US 10,162,087 B2
(45) Date of Patent: Dec. 25, 2018

(54) OPTICAL SYSTEM WITH A FRUSTRATED ISOTROPIC BLOCK

(71) Applicant: NIKON RESEARCH CORPORATION OF AMERICA, Belmont (CA)

(72) Inventors: Eric Peter Goodwin, Oro Valley, AZ (US); Zhiqiang Liu, Kawasaki (JP); Yuki Terui, Tokyo (JP)

(73) Assignee: NIKON RESEARCH CORPORATION OF AMERICA, Belmont, CA (US)

(*) Notice: Subject to any disclaimer, the term of this patent is extended or adjusted under 35 U.S.C. 154(b) by 0 days.

(21) Appl. No.: 15/483,887

(22) Filed: Apr. 10, 2017

(65) Prior Publication Data

US 2017/0292860 A1 Oct. 12, 2017

Related U.S. Application Data

(60) Provisional application No. 62/320,985, filed on Apr. 11, 2016.

(51) Int. Cl.
| | |
|---|---|
| *G01D 5/38* | (2006.01) |
| *G02B 27/42* | (2006.01) |
| *G02B 5/122* | (2006.01) |

(52) U.S. Cl.
CPC ............ *G02B 5/122* (2013.01); *G01D 5/38* (2013.01); *G02B 27/4233* (2013.01)

(58) Field of Classification Search
CPC ......................... G02F 1/195; G01N 29/0681
See application file for complete search history.

(56) References Cited

U.S. PATENT DOCUMENTS

| | | | | |
|---|---|---|---|---|
| 5,973,864 | A * | 10/1999 | Lehmann | G01J 3/42 359/834 |
| 6,020,964 | A * | 2/2000 | Loopstra | G03F 7/70775 356/401 |
| 8,995,814 | B2 * | 3/2015 | Deshazer | G02B 1/045 385/141 |
| 9,201,313 | B2 | 12/2015 | Liesener | |
| 9,746,348 | B2 * | 8/2017 | de Groot | G01D 5/266 |
| 2010/0297561 | A1 * | 11/2010 | Beerens | G03F 7/70775 430/322 |

(Continued)

*Primary Examiner* — Shawn Decenzo
(74) *Attorney, Agent, or Firm* — Yakov S. Sidorin; Quarles & Brady LLP

(57) ABSTRACT

An optical system configured as part of optical metrology unit used to assess the operational status of a workpiece and, in a specific case, configured as an encoder head of a lithographic exposure tool. The optical system is devoid of a stand-alone optical corner-cubes and includes, instead, a single, imperfect or frustrated cuboid of optically-isotropic material that, in operation with the diffraction grating of the workpiece, simultaneously forms four interferometric signals for measuring x-, y-, and z-positions of the workpiece grating relative to the optical system. Proposed system and method solve problems of (i) structural complexity of a conventional metrology unit for use in an exposure tool, (ii) burdensome alignment of the multitude of optical prisms in the process of forming such metrology unit, and (iii) cyclic non-linear errors associated with measurements involving conventional corner-cubes-based metrology units.

21 Claims, 9 Drawing Sheets

(56) References Cited

U.S. PATENT DOCUMENTS

| | | |
|---|---|---|
| 2012/0092669 A1* | 4/2012 | Fiolka ................ G01M 11/0257 356/365 |
| 2012/0194824 A1* | 8/2012 | de Groot ............ G01B 9/02003 356/482 |
| 2012/0320380 A1* | 12/2012 | Schonleber ........ G01B 11/0625 356/479 |
| 2013/0004884 A1 | 1/2013 | Kishi |
| 2013/0048842 A1* | 2/2013 | Goodwin ........... G01D 5/34723 250/231.1 |
| 2013/0050829 A1* | 2/2013 | Efimov .............. G02B 27/1093 359/569 |
| 2013/0114062 A1 | 5/2013 | Liesener |
| 2013/0128522 A1 | 5/2013 | Kuo |
| 2013/0330662 A1* | 12/2013 | Goodwin ................. G01J 1/42 430/30 |
| 2014/0049762 A1 | 2/2014 | Goodwin |
| 2015/0185617 A1* | 7/2015 | Markle ................ G03F 7/2051 430/269 |
| 2015/0276385 A1 | 10/2015 | Goodwin et al. |
| 2017/0097574 A1* | 4/2017 | Goodwin ............ G03F 7/70141 |
| 2018/0017781 A1* | 1/2018 | Markle .............. G02B 26/0833 |
| 2018/0024448 A1* | 1/2018 | Tung .................... G03F 9/7026 |

* cited by examiner

OPTICAL SYSTEM WITH A FRUSTRATED ISOTROPIC BLOCK

CROSS-REFERENCE TO RELATED PUBLICATIONS

The present application claims benefit of and priority from the U.S. Provisional Patent Application No. 62/320, 985 filed on Apr. 11, 2016, the disclosure of which is incorporated herein by reference.

TECHNICAL FIELD

The present invention relates to systems and methods for measurement of spatial alignment of a workpiece with respect to a chosen reference and, more particularly, to methodology of such measurement utilizing an optical encoder head, which is built around a single optically-frustrated block made of isotropic material and is devoid of an individual prismatic element such as a stand-alone corner cube.

BACKGROUND

Various optical systems are designed with a purpose of transferring an image of chosen pattern(s) from a pattern-source onto a target workpiece, often multiple times during the manufacturing process. The change in relative orientation and/or position between the target workpiece and the imaging optical system—whether intentional or unintentional—understandably causes the deviations and/or shifts of images projected onto the workpiece from the location(s) of the image(s) determined by design of the process. This begs a question of maintaining such relative orientation during the process or, at least, the ability to determine or track the change of it to compensate for such change in real time.

A non-limiting example of such optical system is provided by an optical metrology system. The optical metrology system can be implemented to qualify the fitness of the already-fabricated workpiece (such as a flatness of a surface or inter-relationship among the structural layers of an optically-complex flat-panel display that came from the manufacturing—process conveyor, or mutual orientation or spatial profiles of optical surfaces of an optical reflector—be it a single surface reflector or an asymmetrically-profiled multi-faceted adaptive optics mirror), or to simply qualify the repositioning/reorientation of the target workpiece (such as a linearly moving stage or a stage defining a tilt or tip of a surface with respect to a reference).

A non-limiting example of a rather specific optical metrology system is offered by a metrology sub-system of a lithographic exposure apparatus (or exposure tool, for short), that is commonly used to transfer images from a reticle, carrying a chosen pattern, onto the workpiece. The workpiece in this case may be (an optionally-repositionable) component that provides an image plane for images of multiple patterns, projected on such component one after another; a substrate (in a rather specific case—a semiconductor wafer); or a component of a panel display fabricated with the use of lithographic processing. A typical exposure apparatus, used for transfer of a pattern from a pattern-source such as a reticle, for example, onto a workpiece of interest (interchangeably—a substrate) may include an illumination source, a reticle stage assembly (that positions a reticle within the apparatus), an optical assembly containing the so-called projection optics, and a workpiece stage assembly (that positions the workpiece).

In a specific case, a measurement or metrology sub-system (that monitors positions of the pattern-source and the target workpiece) often employs an optical contraption that can generally be referred to as an encoder head, and a control system that governs operations of various assemblies to adjust, when required, mutual positioning of the reticle and the target substrate. The geometrical features of patterns transferred from the pattern-source onto the target workpiece are often extremely small, which imposes unparalleled tight requirements on precise positioning of the target workpiece and the pattern-source to ensure high-quality manufacture and/or testing of the already manufactured workpiece.

Accuracy of the measurement/metrology sub-system constantly requires improvement (this is particularly apparent in the case of exposure tool; here, it is partly driven by advances in design of the exposure tool), while relatively small size, simplicity of construction, a need for reduced number of moving parts and high sensitivity remain as practical limitations.

The very kernel of the encoder heads of the related art is structured and built around prismatic elements that include multiple corner cubes. See, for example, US 2013/0128255, US 2015/0276385, US 2014/0049762, to name just a few, the disclosure of each of which is incorporated by reference herein. The disclosure of each of U.S. patent application Ser. Nos. 14/736,118 and 13/796,316 is also incorporated herein by reference.

As appreciated by a skilled artisan and additionally discussed below, the corner-cube-based design necessarily imposes operational shortcoming on the metrology sub-system's structure, among which there are large number of constituent elements/parts, structurally complex input-output optical assemblies, limited size of the optical beam reaching a diffraction grating of the metrology sub-system (which immediately translates to the smaller number of grating lines or grooves available for averaging of optical information), as well as the operational coupling of the sampling of a section of the diffraction grating with measurement beams on the z-position of the grating (that is, a position of the grating along an optical axis of the metrology sub-system).

An implementation of a light-processing portion of the optical system of the metrology sub-system that is freed from the use of thus far inevitable retroreflecting corner-cube elements alleviates the above-identified shortcomings, thereby making the light-encoding operation and/or optical metrology operation robust and less susceptible to errors.

SUMMARY

An embodiment of the present invention provides an optical system configured for use in a metrology system and method for using such optical system during the process of optical metrology of a chosen workpiece. The optical system is devoid of multiple optical corner cubes disposed in optical communication with a diffraction grating of a workpiece-stage of the exposure system. The optical system comprises a single block of optical material positioned to transmit a portion of an input light beam delivered to the optical system to the diffraction grating without retroreflecting light internally to the single block and to form, in conjunction with such diffraction grating, four spatially-distinct measurement beams required for determination of a change of orientation of the diffraction grating with respect to the single block.

A related embodiment provides an optical system including an optical beamsplitter having an input side and first and second planar output sides; a single frustrated cuboid having an input planar facet disposed parallel to the first planar output side to receive a first portion, of an input beam of light, that has traversed the input side and the first planar output side of the optical beamsplitter; and a single reference optical element configured to receive a second portion, of the input beam of light, that has traversed the input side and the second planar output side of the optical beamsplitter.

Embodiments of the invention additionally provide an optical system configured to transmit an input light beam therethrough towards a workpiece and to form a return light beam upon interaction of said light with a diffraction grating associated with the workpiece. Such optical system includes (i) a light access unit defining input optical apertures and output optical apertures in a plane of the light access unit; (ii) an optical beamsplitter having an input side substantially parallel to the plane and first and second output sides; (iii) a first single first block of optical material positioned to receive light (contained in the measurement beam) from the optical beamsplitter and return light (contained in the measurement beam) to an output optical aperture through the optical beamsplitter while not retroreflecting this light internally to the first single block; and (iv) a second single block of optical material disposed to receive the measurement beam. The optical beamsplitter is configured to spatially separate an input light beam that is directed from an input optical aperture and that traverses the input side, into a reference beam and a measurement beam;

BRIEF DESCRIPTION OF THE DRAWINGS

The invention will be more fully understood by referring to the following Detailed Description of Specific Embodiments in conjunction with the not-to scale Drawings, of which.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

The following disclosure addresses an optical system facilitating the accurate and precise determination of the positioning and/or orientation of a workpiece with respect to a chosen reference. The uses of such optical system, as well as types of a workpiece the spatial status of which such optical system observes, are many, and while specific disclosed examples of it include the environment typical for an optical metrology system during the lithographic exposure process, it is intended to include—and should be considered and understood as including—any applicable situation or use in which the implementations of the optical system of the invention improve and/or simplify the operation of an optical metrology system.

Figure 9:
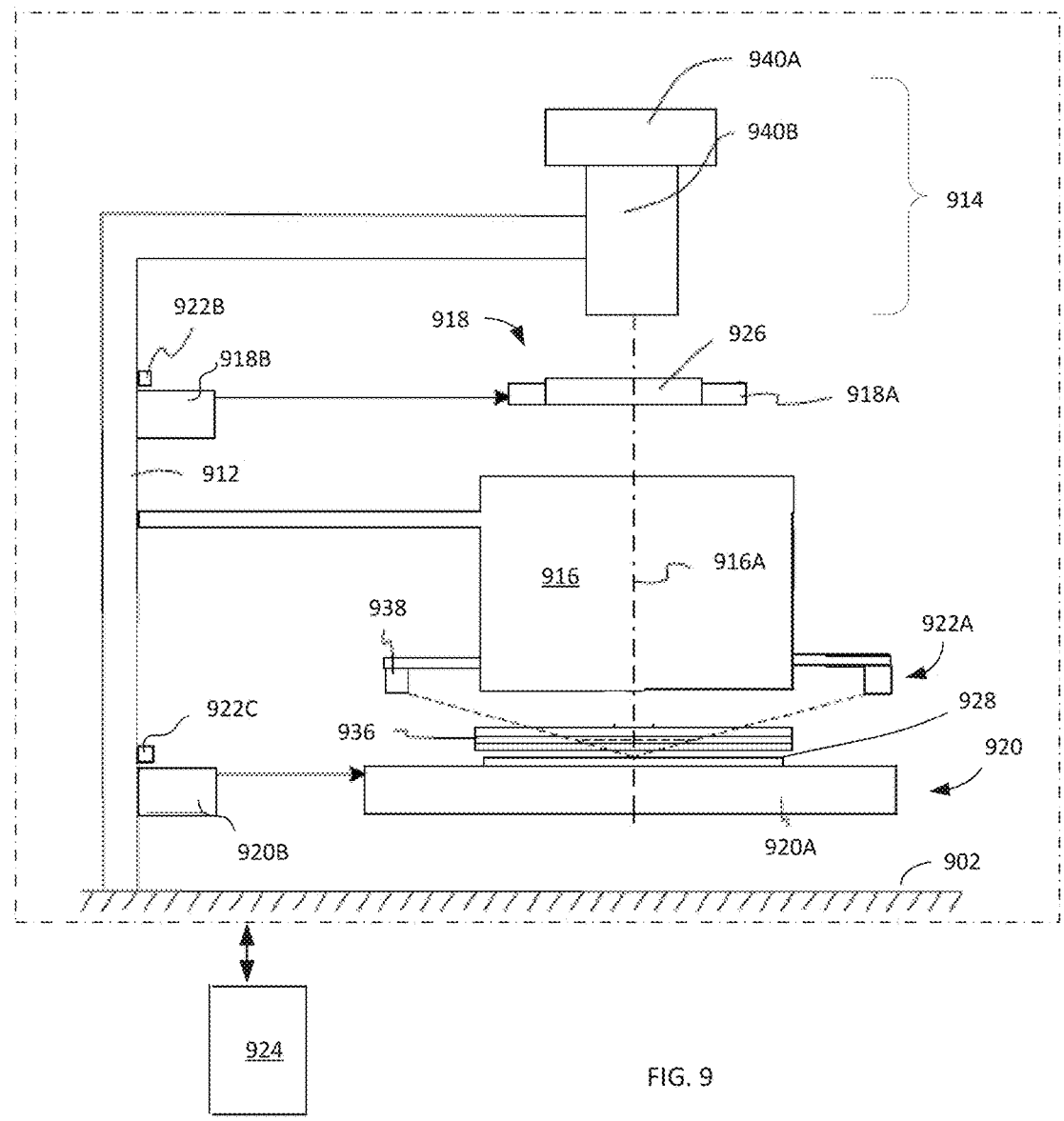
FIG. 9 is a diagram schematically illustrating a lithographic exposure apparatus employing an embodiment of an optical system of the invention.

To appreciate the context and operational environment, in which an embodiment of the proposed optical metrology tool may be used, a person of skill may find useful the following general description of a typical exposure apparatus. The provided example of the exposure apparatus (also interchangeably referred to as a lithographic apparatus or exposure tool)—normally utilizes (i) a conventional metrology system constructed around an encoder head equipped with individual corner cube retroreflectors and, optionally (ii) an autofocus system (AFS) for measurements of the workpiece displacements—is provided in PCT/US2012/043186 the disclosure of which is incorporated herein by reference. FIG. 9 schematically illustrates, in reference to the provided Cartesian system of coordinates, a schematic illustration of such exposure apparatus. The exposure tool that is intended to utilize an embodiment of the metrology sub-system of the present invention, instead of a conventional metrology system, can be employed for workpiece alignment in various contexts including but not limited to microlithography (such as semiconductor or flat panel lithography, for example) and various steppers/repositioners.

The exposure apparatus 900 includes an apparatus frame 912, an illumination system 914 (also referred to as irradiation apparatus), an optical assembly 916, a reticle stage assembly 918, a workpiece stage assembly 920, a positioning system (shown as a combination of several units including systems 922A, 922B, 922C), and a control system 924. The design of the components of the exposure apparatus 900 can be varied to suit specific requirements. The exposure apparatus 900 may be mounted to/on a mounting base 902, such as the ground, a base, or floor, or some other supporting structure.

Apparatus Frame. The apparatus frame 912 is rigid and supports and/or houses at least the reticle stage assembly 918, the optical assembly 916, the workpiece stage assembly 920, and the illumination system 914 above the mounting base 902.

Illumination System. The illumination system 914 includes an illumination source 940A and an illumination optical assembly 940B. The illumination source 940A emits radiation to which the wafer/work-piece 928 is exposed and which is guided by the illumination optics of the assembly 940B to the optical assembly 916, along an optical axis 916A. On its way to the optical assembly 916, the beam of radiation illuminates a portion of the reticle 926 to gain spatial pattern of irradiation representing the pattern of the reticle 926.

The illumination source 940A can be, for example, any of a g-line source (436 nm), an i-line source (365 nm), a KrF excimer laser (248 nm), an ArF excimer laser (193 nm), a F2 laser (157 nm), or an EUV source (13.5 nm). The workpiece-illuminating (exposure) light may be provided at about 193 nm (by an ArF excimer laser system, for example) light (with a wavelength of 193 nm), but it can also include ultraviolet light such as described in, for example, U.S. Pat. No. 7,023,610. The source 940A of illuminating light may exploit harmonic frequency conversion or utilize an optical-fiber based amplifier, to produce radiation at a predetermined wavelength. Alternatively, the illumination source 940A can generate charged particle beams such as an x-ray or an electron beam. For instance, in the case where an electron beam is used, thermionic emission type lanthanum hexaboride (LaB6) or tantalum (Ta) can be used as a cathode for an electron gun. Furthermore, in the case where an electron beam is used, the structure could be such that either a mask is used or a pattern can be directly formed on a substrate without the use of a mask.

Optical Assembly.

The optical assembly 916 projects and/or focuses the light passing through the reticle 926 onto the work piece 928. Depending upon the design of the exposure apparatus 900, the optical assembly 916 can scale (i.e., to magnify or reduce, with a specific coefficient) dimensions of the pattern of the reticle 926. In a specific implementation, the optical assembly 926 may simply relay the pattern of the reticle 926 onto the workpiece (i.e., have a unit magnification).

Reticle Stage Assembly.

The reticle stage assembly 918 holds and positions, (with the use of a reticle stage mover assembly 918B) the reticle stage 918A that retains the reticle 926 relative to the optical assembly 916 and the workpiece 928. The reticle stage mover assembly 918B can be designed to move the reticle stage 918A along any of the x, y, and z axes.

Workpiece Stage Assembly.

The workpiece stage assembly 920 holds and positions (with the use of a workpiece stage mover 920B) the workpiece 928 with respect to the image of the illuminated portion of the reticle 926 projected onto the workpiece. The workpiece stage mover 920B can be designed to move the workpiece 928 along any of the x, y, and z axis. In one embodiment, the workpiece 928 can be scanned while the workpiece stage assembly 920 moves the workpiece 928 along the y-axis.

Positioning System.

The positioning system (922A, 922B, 922C) monitors movement of the reticle 926 and the workpiece 928 relative to the optical assembly 916 or some other reference. As shown in FIG. 9, the position system 922 includes (i) an AFS 922A that maps the topography of the workpiece 928 relative to the optical assembly 916 along the Z axis (which is collinear with the optical axis 916A), about the X axis, and about the Y axis prior to exposure of the workpiece with improved accuracy; (ii) a reticle measurement system 922B (only a portion of which is illustrated) that monitors the position of the reticle stage 918A and the reticle 926; and (iii) a workpiece measurement system 922C (only a portion of which is illustrated) that monitors the position of the workpiece stage 920A along the X and Y axes, and about the Z axis. Due to operation of the position system, the workpiece stage assembly 920 can be controlled to position the workpiece 928 with improved accuracy. The positioning system 922 can utilize laser interferometers, encoders, autofocus systems, and/or other measuring devices.

One implementation the autofocus system 922A includes a reference system 936 providing a reference signal used in conjunction with and related to the measurement of any changing operational parameter of the AFS 922A but not the position of the workpiece 928 along the optical axis 916A. The AFS 922A further includes a measurement system 938, which provides a measurement signal used in conjunction with and related to the measurement of anything changing in the AFS 922A including (the change of, if present) position of the workpiece 928 along the optical axis 916A. By comparing the reference and measurement signals, the position of the workpiece 928 is measured, which is accompanied with reduction of the stability requirements for many of the components of the ALS 922A.

A typical measurement system 938 may include an encoder assembly (not shown) that measures, in operation, the position of the workpiece 928 (as shown—the wafer). For example, in some embodiments, the encoder assembly can be designed to monitor and/or measure the position of the work piece along two axes (e.g., along the x- and y-axes). Additionally and/or alternatively, the encoder assembly can be designed to measure and/or monitor the position of the workpiece 928 along all three axes (i.e., to specify the 3D position of the workpiece 928).

The conventional measurement system 938 may also include a stage grating (not shown) that is secured to a side of the workpiece stage 920A (of the assembly 920) that retains the workpiece 928, and one or more fixed encoder heads (not shown). The number of encoder heads and their mutual positioning and orientation can be varied according to the design of the exposure apparatus 900 and/or the measurement system 938, and the amount of travel of the stage 920A along x- and y-axes. The use of multiple encoder heads enables the encoder assembly to more accurately measure the position of the stage 920A, and thus the position of the workpiece 928 that is retained by the stage 920A. Examples of the structure(s) of the measurement system 938 and conventional encoder head(s) are discussed in detail in U.S. 2014/0049762, which is incorporated herein by reference, and will not be addressed here in any additional detail.

Control System.

The control system 924 is operably connected to and governs the operation of at least the illumination system 914, the reticle stage assembly 918, the workpiece stage assembly 920, and the positioning system 922. The control system 924 acquires measurement data, from the positioning system 922, that represent position and/or orientation and/or movement of the reticle 926 and/or workpiece 928 with respect to the optical assembly 916 or another chosen reference. Based on these data, the control system 924 controls the assemblies 918, 920 to precisely position the reticle 926 and the workpiece 928. The control system 924 can include one or more processors and electronic circuits, at least one of which may be specifically programmed to perform steps of data acquisition, data processing, and control of operation of the components of the apparatus 900.

Generally, the exposure apparatus 900 can be used as a scanning type photolithography system for optical transfer of a spatial pattern from the reticle 926 onto the workpiece 928, with the reticle 926 and the workpiece 928 moving synchronously. Alternatively, the exposure apparatus 900 can be used as a step-and-repeat type photolithography system that exposes the reticle 926 while the reticle 926 and the workpiece 928 are stationary. The use of the exposure apparatus 900, however, is not limited to a photolithography system for semiconductor manufacturing and can include, as a non-limiting example, the use as an LCD photolithography system that projects a liquid crystal display device pattern onto a rectangular glass plate or a photolithography system for manufacturing of a thin film magnetic head.

Conventional Use of Corner-Cube Reflecting Structures in a Metrology Tool

Figure 1:
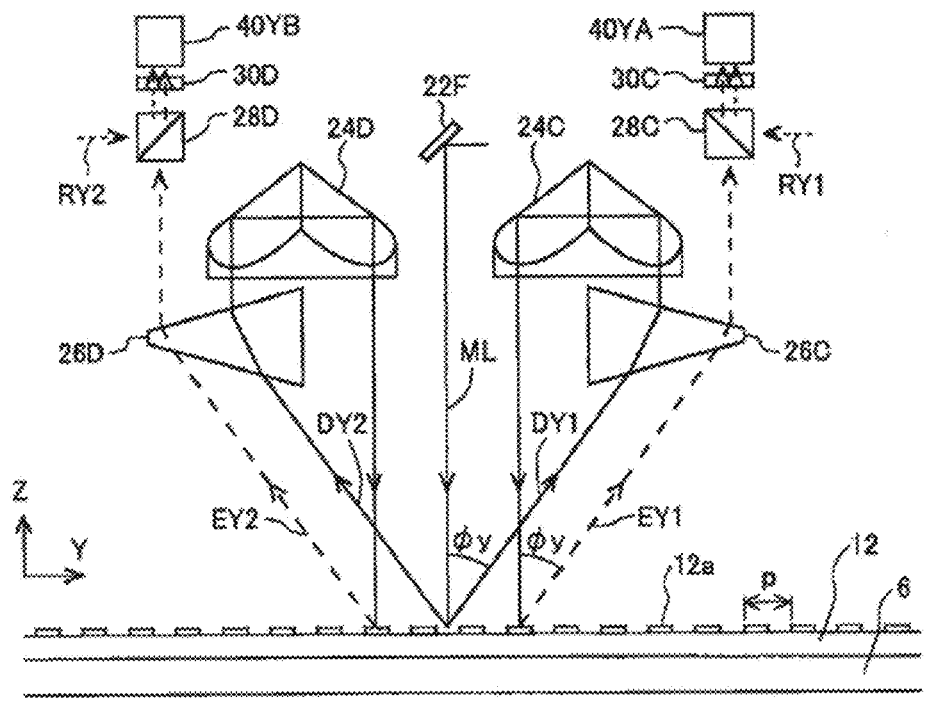
FIG. 1 is a schematic diagram of a portion of an encoder head of related art, utilizing corner-cube reflectors and other stand-alone prismatic elements.
Figure 2A:
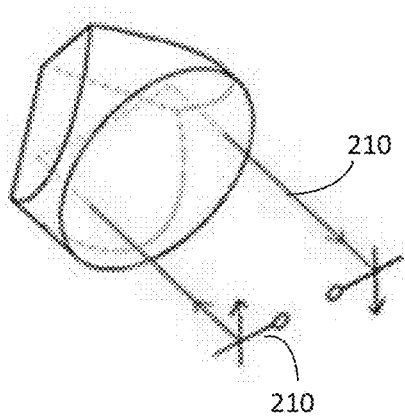
FIGS. 2A, 2B provide schematic examples of individual, stand-alone corner-cube structures.
Figure 2B:
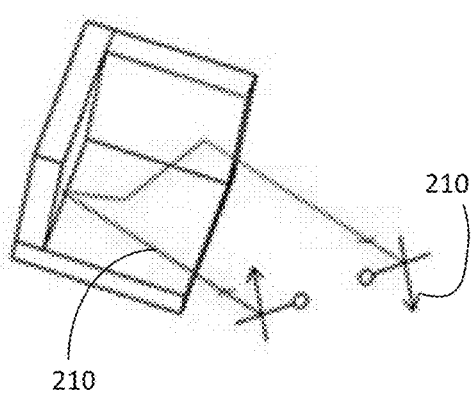

In order to measure x-, y-, and/or z-coordinates or parameters of a position of a workpiece, moving in relation to the optical imaging system employed to project light onto the workpiece, a two-dimensional (2D) diffraction grating is sometimes employed in conjunction with the workpiece. Each light beam that is nearly normally incident onto such grating forms, in diffraction at the grating, four primary first-order-diffraction beams: two diffracted beams representing respectively +/−1 orders of diffraction in xz-plane and two diffracted beams representing respectively +/−1 orders of diffraction in yz-plane. Light efficiency is rather critical during the measurement of the workpiece-stage positioning, so ideally all four of these first-pass diffraction orders are used as part of the measurement (as opposed to creating multiple first pass beams, one for each measurement). The basic principle of such measurement requires the measurement light beam to pass of be diffracted by the workpiece-stage grating twice (while being reflected towards the grating in between the two occurrences of the diffraction) so that any change of tip or tilt of the grating does not result in a corresponding tip or tilt of the measurement beam of light. This is where the related art took advantage of the use of corner-cubes to effectuate such retroreflection. See, for example, FIG. 1 (corresponding to FIG. 2B from U.S. 2013/0128255), which shows the use of four corner cubes and four shear-correction prisms required to effectuate four measurements, in xz- and yz-planes, based on a single input beam of light. (For description of all optical elements and the overall system of FIG. 1, the reader is referred to the description of FIG. 2B of U.S. 2013/ 0128255).

For the purposes of this disclosure, and as understood in the art, acorner cube (or a corner-cube prism) is defined as an optical component structure to possess the unique ability to return a beam incident thereon directly towards the point of origin of such beam (with possible lateral displacement of the beam), regardless of the beam's angle of entry into such component. Diagrams of a typical "stand alone" corner cube is provided in FIGS. 2A, 2B, where arrows 210 indicate either input or output beams of light and schematics 214 illustrate the preservations or change of parity and orientation of an image formed in light reflected by the corner cube with respect to those of an object. It is appreciated that the internal corners of the components of FIGS. 2A, 2B affect the internally-propagating light beams in the same exact fashion.

Figure 2C:
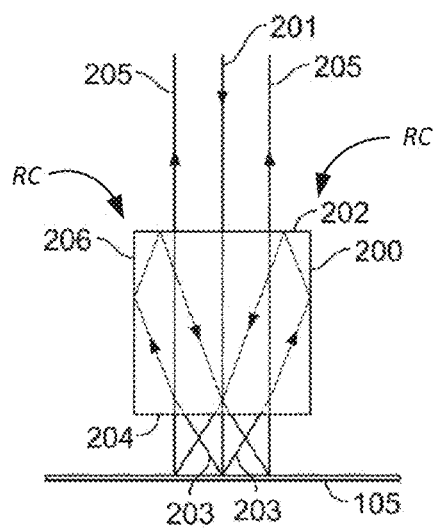
FIGS. 2C, 2D are schematic diagrams of portions, of encoder heads of related art, that are configured to internally retroreflect light.
Figure 2D:
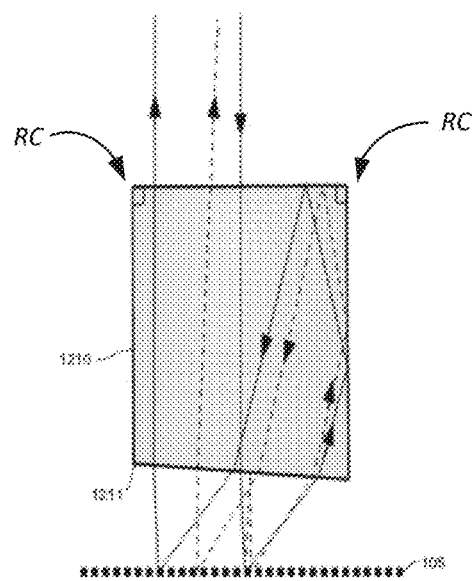

Similarly, the use of a monolithic optical component such as an optical block having individual corners specifically configured to perform as "corner cube" elements or retroreflectors for light internally incident onto such corners has been utilized by, for example, U.S. Pat. No. 9,201,313 (two embodiments of such monolithic optical component utilized in encoder heads of U.S. Pat. No. 9,201,313 are shown in FIGS. 2C, 2D, with retroreflecting corners formed by the three adjacent to one another facets of the block labelled as RC and the element 105 designating the workpiece-stage diffraction grating). As will be discussed in more detail below, embodiments of the invention are configured in stark contradistinction with the embodiments of FIGS. 2C, 2D of related art, at least in that the present embodiments are intentionally dimensioned to not form (to be devoid of) and/or not utilize, in operation, retroreflecting corners such as those marked as RC in FIGS. 2C, 2D). Notably, as understood by a person of skill in the art, the practical use of all these optical elements—whether the individual corner-cubed of FIGS. 2A, 2B or the specifically-structured monolithic components of FIGS. 2C, 2D that include such corner-cube structural elements—is subject to tedious spatial pre-aligned relative to one another, without which accurate and reliable measurement results would remain questionable.

General Considerations

Encoder heads of the related art, configured for measuring the position of a target component (disposed, for example, on a workpiece stage) or the position of the workpiece-stage itself with sub-nm accuracy, are typically structurally complex and require the use of many optical components and/or tight operational tolerances and difficult alignment of such components. Optical engineers find themselves in a tight spot in attempt to satisfy several operational requirements that must be met for an encoder head to work properly, while continuing the quest for reducing the complexity and cost of the encoder heads. The "must-meet" operational requirements include 1. Two passes, of the measurement beam of light, off or by the measurement diffraction grating (workpiece-stage grating) with a return reflection of light occurring in between these two passes, in order to remove tip/tilt errors from the measurement beam;
2. Utilizing the measurement beam with the largest diameter possible (for a given encoder head package size) to average the results of the measurement over as many grating grooves rulers line as possible; and, last but not least,
3. Achieving high light efficiency (as a 2D) diffraction grating is at best about 20% efficient on each of the 2 passes of the measurement beam of light by the grating).

A person of skill in the art is also often concerned with some optional requirements, the satisfaction of which is sometimes desirable. These include:

1. Reducing the size of the resulting encoder head package to the smallest possible;
2. Reducing the number of utilized optical components;
3. Increasing the relative ease of alignment by utilizing double pass elements, etc
4. Using all 4 diffraction order beams from the $1^{st}$ pass beam (to increase light efficiency), and
5. Ensuring the operational ease of fiber-centered input/output of light into the encoder head unit (if such input-output is, indeed, employed).

The appreciation of the fact that additional, reference light beams are also necessarily present/formed in the encoder head system begs additional questions: Is it required for such reference beams of light to be also incident on/interact with the diffraction grating, thereby removing z- (that is, axial) sensitivity of the measurement? Can the reference beams of light be generated with high efficiency while requiring minimal space in the package of the overall encoder head? The realization of an unsolved need to prevent parallel stray light beams from being introduced into a measurement system and causing non-linear errors in the measurement adds another level of deliberation of an operably-successful design of an encoder head.

All these are the considerations and motivations behind the design of the embodiments discussed below.

In accordance with embodiments of the present invention, methods and apparatus are disclosed configured to overcome a need for use of (i) stand-alone multiple custom-made prismatic elements and/or built-into-monolithic-structures retroreflecting corners; as well as (ii) a small-diameter measurement beam of light in a metrology system of related art. The idea of the present invention is based on the realization that configuring the metrology system around the use of a single optical block of glass devoid of operable "corner-cube" retroreflecting portions to effectuate the double-pass return of light (in a non-retroreflecting fashion) within the metrology system greatly reduces the required number of high-quality optical components in comparison with that used in the related art, mitigates the stray noise, and simultaneously allows for increase of size of the measurement beam of light, thereby solving at least these the structural and operational problems remaining in exposure systems of the related art. Notably, the single optical block of the invention is optically frustrated to ensure the reflection of light incident internally at the corner portion of such block without retro-reflecting such light.

Accordingly, operational problems and limitations, caused by utilization, in an encoder head of a lithographic exposure tool, of multiple individual optical corner cubes for formation of four diffracted measurement beams required for the determination of change of spatial orientation of a workpiece stage with respect to the encoder head, are solved by using for the same purpose a single block of isotropic optical material. One problem solved by the invention is the previously-persisting need in the art to use optical "corner cube" structures—whether stand-alone ones or those forming part(s) of bigger optical elements—each of which is produced at a high cost. Such previous use is now substituted with a use of a single monolithic and judiciously-shaped optical component.

Another solved problem is the high operational cost and time associated with necessary mutual alignment of multiple optical corner cubes with respect to both the input light beam produced by a light source used with the encoder head and diffracted beams formed from such input light beam by a workpiece-stage diffraction grating. Such mutual alignment is now replaced with an alignment of the single block with respect to the input light beam.

Yet another solved problem is the limitation conventionally imposed by the structure of encoder head containing "corner cube" structure(s) on the size of the input beam of light. Embodiments of the current invention allows to increase substantially the cross-section of the input beam, which translates the substantial reduction of measurement errors previously caused by imperfections of the workpiece-stage diffraction grating employed in the measurement.

Furthermore, the proposed design(s) ensure that an axis along which a measurement beam of light is returned by the measurement arm of the encoder head towards the optical detection unit angularly deviates from the axis along which the measurement beam of light enters the measurement arm of the encoder head (that is, angularly deviates from the input beam). Stated differently, at least the measurement arm of the encoder head, as a whole, does not perform the act of retroreflection of input light, in stark contradistinction with encoder heads of related art while, at the same time, the single optical block of the measurement arm does not retroreflect light internally. Such configuration helps to prevent parallel stray beams from being introduced into the light-measurement system from unwanted reflections that make multiple passes through at least part of the encoder head and still emerge parallel to the measurement beam(s).

In certain embodiments the encoder head assembly configured according to the idea(s) of the invention enables such features as: (i) improved sensitivity to the workpiece-stage displacement in reference to the encoder head; (ii) improved light efficiency; inhibition of a. cyclic non-linear error (CNLE), or stray light rejection; (iv) minimal non-common beam path; (v) minimal number of stand-alone output optical fibers; (vi) reduced in size and complexity optical assembly of the encoder head for a given diameter of the measurement beam. As a result thereof, the workpiece that is being measured can be positioned with improved accuracy, and the exposure apparatus can be used to manufacture higher density wafers.

In particular, the present invention solves problems of (i) structural complexity of a conventional encoder head for use in an exposure tool and (ii) burdensome alignment of the multitude of optical prisms in the process of forming such encoder head by substituting the multiplicity of corner-cubes with a single, imperfect or frustrated cuboid of glass that, in operation with the diffraction grating of the workpiece-stage, simultaneously forms four interferometric signals for measuring x-, y, and z-positions of a workpiece-stage grating relative to the encoder head.

Unless specified otherwise, the terms "single element", "single optical element", "sole element" and similar terms refer to an optical body that is monolithic—that is, consisting of one piece (solid or unbroken, as opposed to one integrated or constructed from several pieces each of which has, on its own, identifiable geometrical boundaries) of the same, single optical material—and that is characterized by spatially uniform optical and mechanical properties. Accordingly, an optical element formed as a result of combining several individual optical elements into one integral whole is not considered to be a single optical element.

Unless specified otherwise, the term "cuboid" is used to define a parallelepiped of which all faces are rectangular.

The term "substantially geometrically perfect", when used in reference to a shape of a particular optical body, denotes a minimized (or even substantially absent) deviation from the otherwise-determined or known shape of such body as accepted in results of fabrication of such body employed as known in the art. One example would be an optical cube with a corner as a result of internal reflection at which the beam of light is retro-reflected, or returned along the same axis it had when impinging on the corner, with a possible angular deviation not exceeding, for example, 3 arcseconds. In a related embodiment, the identified angular deviations do not exceed 5 arcseconds; in yet another embodiment—an arcsecond.

The term "frustrated", when used in reference to a shape of a particular optical body, denotes a deviation from the otherwise-determined or known shape of such body that has been intentionally-introduced to cause to swerve or turn aside light propagating through such body from an optical path the light would take when the optical body is not frustrated. One example of a frustrated optical component would be a nominally plane mirror the planar reflecting surface of which deviates from a flat optical surface as a result of, for example, surface roughness and reflects light at angle(s) different from that of specularly reflected light (for example, produces diffused reflection of incident light). A frustrated optical cube, as will be understood from the following disclosure, is a cube the internal corners of which reflect light internally with operable deviation from the direction of incidence ((that is, in a non-retroreflecting fashion).

Formation of Measurement and Reference Beams

Figure 3A:
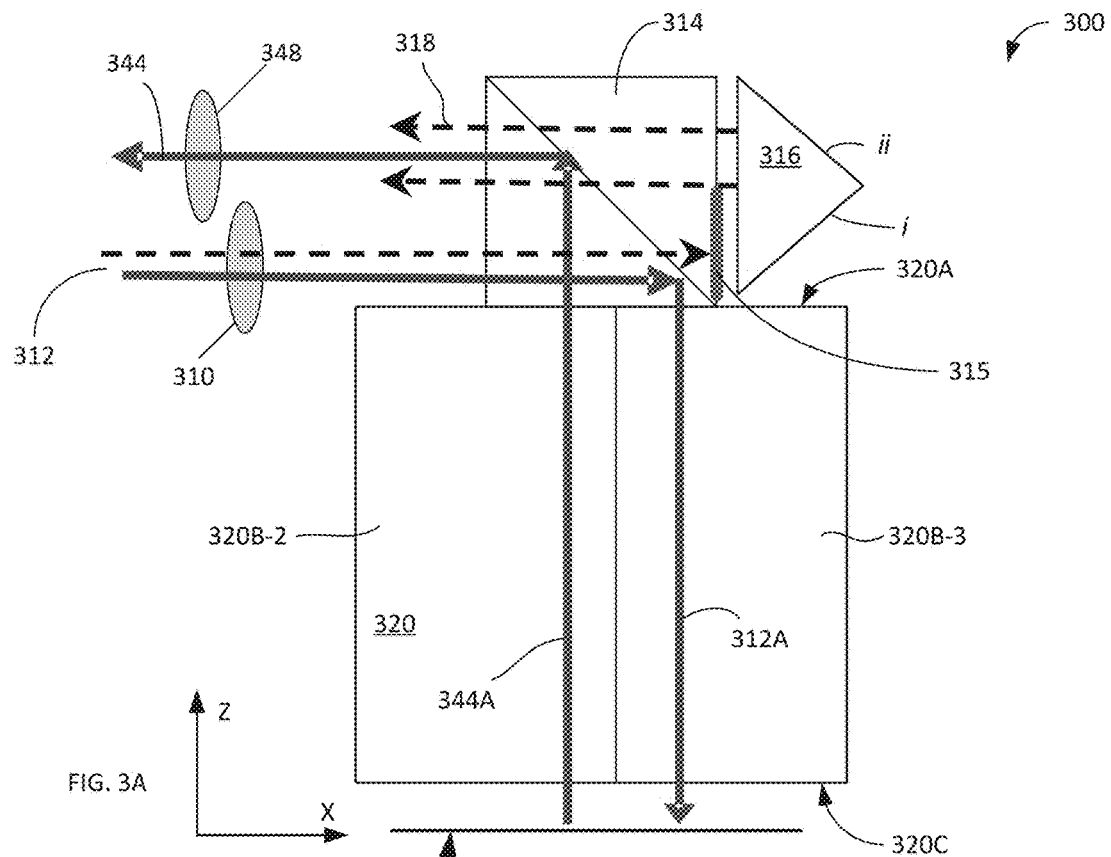
FIGS. 3A, 3B, 3C, and 3D provide schematic illustrations of various views of an embodiment of the invention that does not retroreflect light internally to a monolithic single optical block.
Figure 3B:
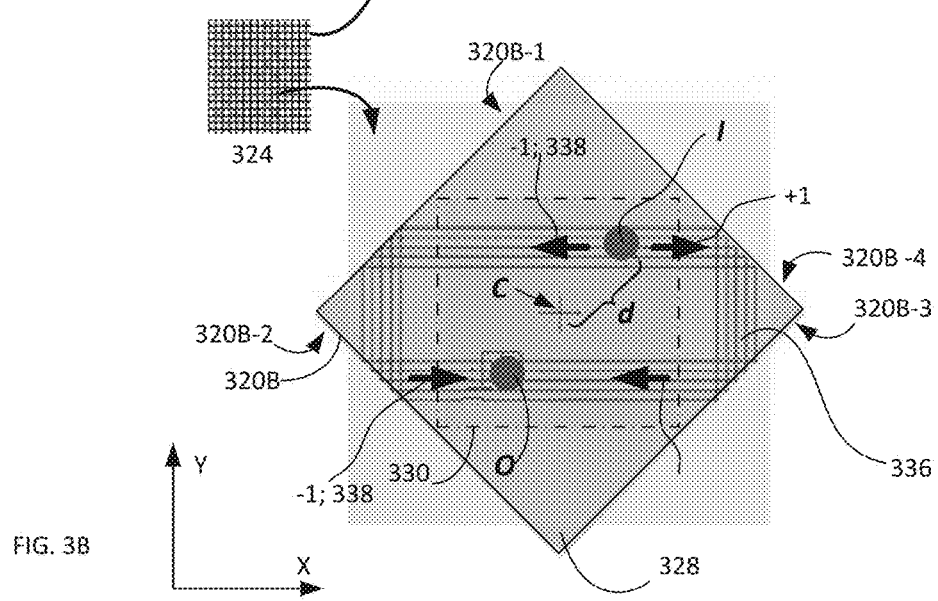

FIGS. 3A, 3B illustrate schematically one simple implementation 300 of an optical metrology tool configured as an encoder head. Here, as shown in side view of FIG. 3A, a lens element 310 collimates an input beam of light 312 (delivered, in one embodiment, through an optical fiber unit). The beam 312 contains substantially monochromatic light yet including two wavelengths slightly shifted with respect to one another light by a small amount sufficient to perform a heterodyne-type of measurement, as discussed in our prior applications (in one embodiment—by the amount corresponding to the optical frequency shift having a value between about 1 MHz and about 40 MHz; in a related embodiment—by about 0.027 picometer at a wavelength of about 633 nm).

One portion 312A of the beam 312 is then folded down, in a—z-direction, as a measurement beam 312A with the use of a beamsplitter 314 onto the single glass block 320 and through it onto the workpiece-stage diffraction grating 324. The beamsplitter 314 may be in physical contact with the single glass block 320 (as shown) or, in a related embodiment, there may be a gap between their facing-each other surfaces (the gap optionally filled with an optical material). Another portion 312E of the input beam 312 is directed through the polarization beam splitter 314 to a local secondary 2D diffraction grating 315. The pitch of grating 315 in any of the two dimensions is larger than 1 micron, creating four reference first-order diffracted beams 318 deviating from one another by about +/−0.5 degrees to match the angular deviation between the measurement beams delivered from the block 320A. These diffraction orders go through a standard corner cube 316 to optically match the handedness of the measurement beams, and are then combined with the measurement beams.

The measurement beam 312A passes through the single glass block 320 and is incident onto a two-dimensional (2D) diffraction grating 324 affixed to the workpiece-stage (not shown) as known in the art. In this embodiment, orientations of grooves lines of the grating 324 are, as shown, along the x- and y-axes. At the same time, the foot-print 328 of the single glass block 320 (formed as a projection of the input/upper surface 320A of the block 320 onto the xy-plane and generally represented by a rectangle or, in a specific case, a square as shown) is rotated by substantially 45 degrees (with respect to the x- and y-axes) about the z-axis.

FIG. 3B illustrates the top view of the block 320, as seen against the z-axis. The area of surface 320A corresponding to the area of contact between the beamsplitter 314 and the block 320 (or, alternatively, corresponding to the foot-print of the beamsplitter 314 onto the surface 320A) and outlined with a dashed-dotted line 330 is preferably devoid of a reflective optical coating (and, optionally, coated with an AR-coating), while the area of the surface 320A that is bound between the perimeter 320B and the line 330 (that is, the area complementary to the area of the foot-print of the beamsplitter 314 onto the surface 320A) is preferably coated with a high-reflection coating at the wavelength of the input beam 312.

Figure 3C:
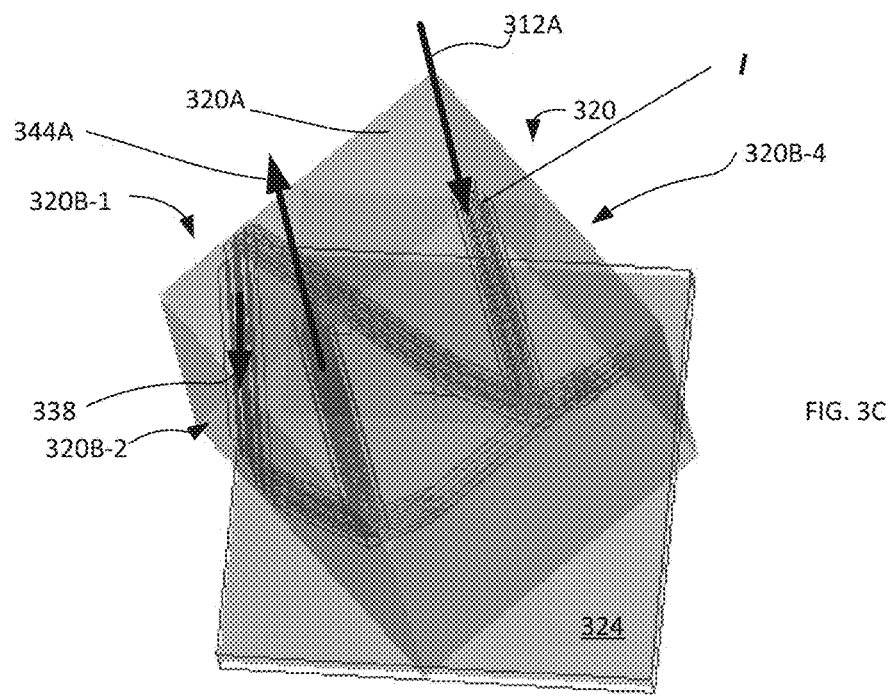

As shown in top view of FIG. 3B, the measurement beam 312A falls along the z-axis onto the grating 324 at point I, and is diffracted by the grating 324 in the direction of the lower surface 320C of the block 320 both in xz- and yz-planes (forming respectively-corresponding diffracted beam representing +1 and −1 orders of diffraction in these planes). For simplicity of the illustration, however, only the beams diffracted in the xz-plane are sketched in FIG. 3B with lines 336 (indicating the propagation of such diffracted beams through the body of the block 320). Similarly, FIG. 3C that illustrates the perspective view of the combination of the block 320 and the grating 324 also shows the beams representing diffraction order(s) formed only in the xz-plane at the grating 324 (two diffracted beams formed at point I of the grating in yz-plane are not shown). The diffracted beams then refract through the surface 320C back into the glass block 320.

The block 320 has six flat surfaces with optical finish: the top surface 320A facing the beamsplitter 314, the bottom surface 320C facing the workpiece-stage and the workpiece-stage diffraction grating 321, and the four facet surfaces 320B-1, 320B-2, 320B-3, and 320B-4. In one embodiment, according to one idea of the invention, facet 320B-1 is made parallel to the z-axis and nominally perpendicular to the surface of the grating 324, while the upper surface 320B is made parallel to the surface of the grating 324. (Put differently, facet 320B-1 is perpendicular to the upper surface 320B, which in turn is nominally parallel to the surface of the grating 324). At the same time, the facet 320B-2 is intentionally formed to be inclined or tilted (with respect to at least one of the surfaces 320A, and 320B-2) at first angle(s) chosen to frustrate/be different from the tight angle (in contradistinction with a right angle formed by the participating optical surfaces of the corner cube, for example). Similarly, the facet 320B-4 (which is the side surface or facet closest to the point fat which the beam 312A passes through the upper surface 320A) is also formed to be judiciously inclined or tilted (with respect to at least one of the surfaces 320A and 320B-3), at second angle(s) chosen to make dihedral angles between 320B-4 and (320A and/or 320B-3) be different from the right angle (again, in stark contradistinction with a precise right angle governing the operation of a corner cube). For example, the facet 320B-2 may be slightly "tilted" about the z-axis while the facet 320B-4 may be slightly "tilted" about the x-axis; or the facet 320B-2 may be slightly tilted about both the z- and x-axes while the facet 320B-4 is slightly tilted about the y-axis. Other tilts are within the scope of the invention. It may be preferred that first and second angle(s) be different from each other. In one specific case, the introduced amount of tilt does not exceed 1 degree; in a related embodiment the combined value of the first and second angles is such amount of tile is between about 0.25 degree and about 3 degrees.

The tilt or tip of the two out of four side facets of the block 320 as discussed above defines the intended frustration of geometry of the single block 320 to intentionally dimension the block 320 as a frustrated optical cuboid. The angular inclination between the bottom surface 320C and the top surface 320A, intentionally defined to be non-parallel to one another (generally with an angular deviation between the two from about 0.15 degrees to about 2 degrees or so, and in a specific case of about 0.5 degrees) used to appropriately handle the zeroth order of diffraction of a measurement beam at the gratings 324, as discussed in more detail below.

At the same time, and according to another idea of the invention, the input lens element 310 and the beamsplitter 314 and the block 320 are intentionally oriented, as a group, such that the input beam 312A is formed to be offset or displaced from the center C of the upper/input surface 320A of the block 320 by a distance d. The distance d and the direction of the offset is judiciously chosen in relation to the geometrical dimensions and the index of refraction of the material of the block 320 such as to direct the beam 338 representing an order of diffraction (−1 order as shown) to be directed, internally to the body of the block 320, to a roof formed by the upper surface 320A and the side facet 320B1 and then to be internally reflected at the facet 320B-2 (in a specific case, such internal to the body of the block 320 reflection can be configured to be a total internal reflection, or TIR).

Figure 4:
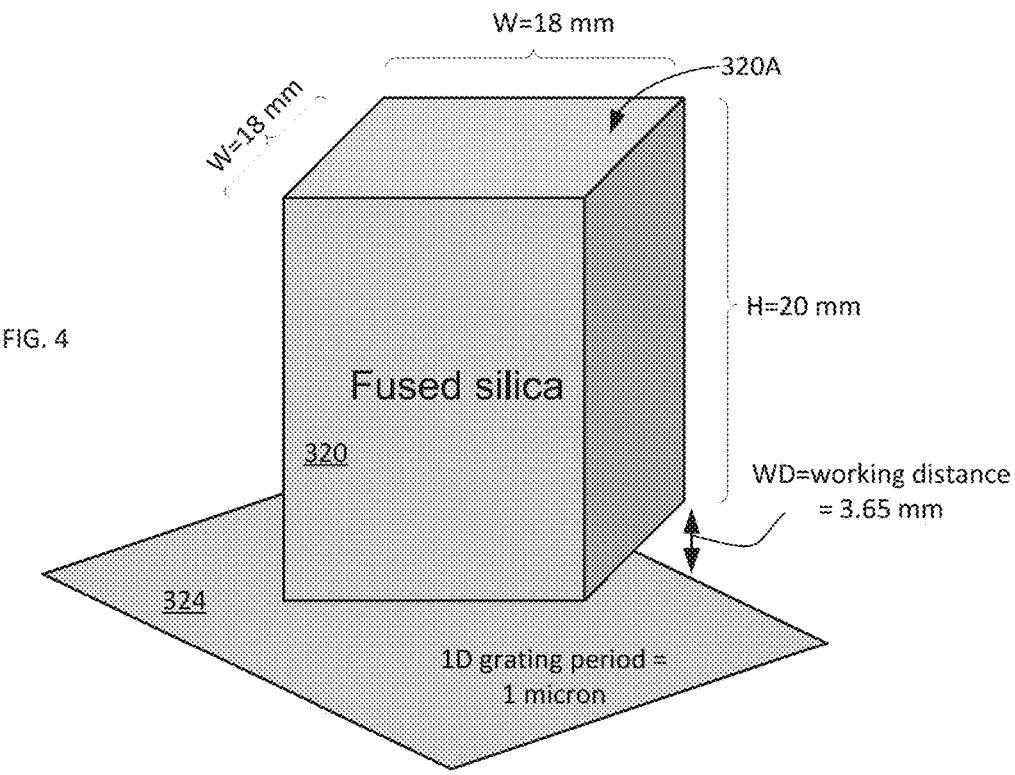
FIG. 4 is a schematic diagram with an example of dimensional coordination of constituent components of the embodiment of FIG. 3A.

Considering the specific example of FIG. 4 (corresponding to the configuration of FIGS. 3A, 3B the point I may be shifted, with respect to the center C in the upper surface 320A, by about 2.8 mm in the x-direction and about 2.8 mm in the y-direction, resulting in d that is slightly larger than the radius of a 5 mm diameter input beam 312.

Referring again to FIGS. 3B, 3C, following the reflection at the roof formed by the surfaces 320A and 320B-1, the beam 338 falls, internally to the block 320 onto the tilted as discussed above side facet 320B-2 to be internally reflected thereat and to propagate, further, through the bottom surface 320C towards the grating 324 yet again. Upon the second pass off of the grating 324, the beam 338 is diffracted for the second time forming corresponding diffraction orders (in the xy-plane and the yz-plane; not shown). A portion of the diffracted light forms a portion of the output 344A, exiting the block 320 at point O.

The cyclic non-linear error (CNLE) of the measurement is caused, in embodiments of the encoder head of the related art, at least in part when any of the measurement beams is returned to the workpiece stage grating for a second occurrence of diffraction at the grating as precise angles that are defined by the perfect 90 degree alignments between the reflectors of the utilized corner-cubes. At least one of the orders of diffraction formed upon the second pass of the measurements beam by the grating is directed to continue to propagate within the optical system of the encoder head and to experience multiple reflections, while coupling at least a small portion of the optical energy to the encoder head output. In the embodiment 300, however, the beam 338 is returned to the grating 324 at a different angle as compared to that provided by an embodiment employing a corner-cube reflector, specifically as a result of and due to frustration of the block 320 (that is, as a result of the above-discussed tilt between the surface 320A, 320B-2 and/or between the facets 320A-1, 320B-2), which clearly differentiates it from an implementation discussed, in U.S. Pat. No. 9,201,313 for example. Such arrangement inhibits a cyclic non-linear error of the measurement. It would be appreciated by a skilled artisan, that a similar tilt-caused frustration of retroreflection of light cannot be utilized for the same purpose of inhibiting the CNLE at any roof or corner of the block 320 (for example, at a roof formed by the surfaces, 320A, 320B-1) at least because the geometrical frustration of a 90-degree optical corner results a "frustrated" corner the angular measure of which now differs from 90 degrees. The frustrated corner, however, causes spatial splitting of the incident beam, upon retroreflection, into at least two beams neither of which is diffracted by the grating 324 in the direction of the encoder head output. In accord with the idea of the invention, only the orientation of that side facet of the block 320 that is the closest to the point I (of entry of light into the block 320, shifted from the center as discussed above) the orientation of that side facet of the block 320 that is the closest to the point O (of exit of light from the block 320, also shifted from the block's center) are changed/frustrated with respect to at least one of the axes.

Figure 5A:
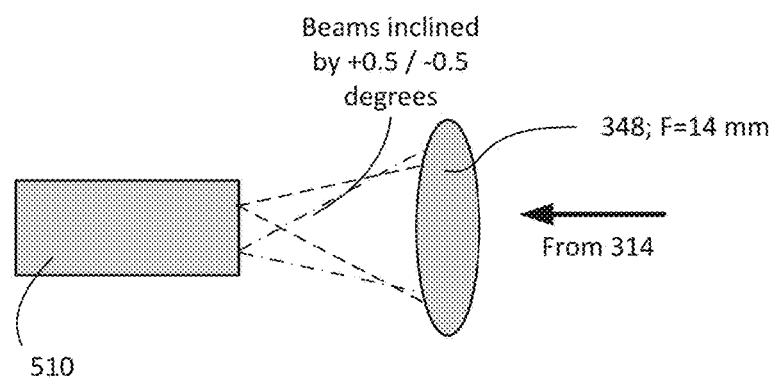
FIGS. 5A, 5B illustrates an output portion of the embodiment of FIG. 3A.
Figure 5B:
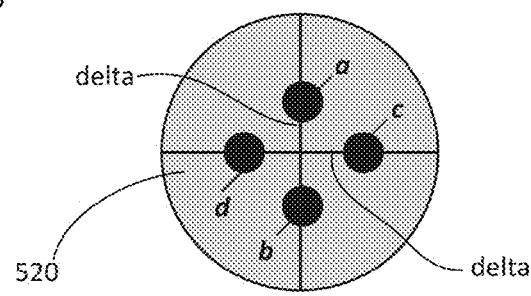

The above-described frustration of the shape of block 320 (as compared to that of the optical cuboid) additionally allows all four beams passing the grating 324 for the second time to be incident on the same spot at the grating and emerge in four slightly different directions (for example, differing by +/−0.5 degrees in x- and y-, depending on the exact amount of the singular frustration of the orientation of the facets/surfaces of the block 320). The different angles of propagation of the two diffracted beams (both formed at the grating 324 at the same heterodyne frequency of the two heterodyne frequencies present in the input beam 312) through the body of the block 324 towards the beamsplitter 314 (and aggregately, for simplicity, shown as 344A, 344) translate to different positions/locations of these beams in the back focal plane of the output lens element 348, where the output optical apertures of are located. This, in turn, facilitates the coupling of the light beams emerging from the grating 324 after the second encounter with the grating to different optical fibers for proper measurement. For example, all four output measurement signals can be coupled with a single lens element 348 to a specific multi-mode output fiber unit 510 having four approximately 50-micron-diameter cores 510A and 125 micron claddings disposed in a single chuck or fiber array holder 520 and separated from the axis of the chuck in the plane of the end facet 520A by, for example, delta=125 microns; FIGS. 5A, 5B). In the embodiment of FIGS. 5A, 5B, the output optical aperture(s) are formed by end facets of the output optical fiber(s). Such configuration further simplifies the input/output unit for the optical encode head 300.

Dimensions of a Measurement Beam.

The maximum size of the measurement beam accommodated by an embodiment of the invention scales with the size of the block 320. Notably, configuration of the encoder head with the use of a frustrated optical cuboid facilitates the reduction of measurement errors caused by fabrication imperfections of the workpiece-stage diffraction grating 324. Indeed, as recognized by a skilled person, the grating 324 is not perfect (the grooves may deviate from straight lines of the wavelengths scale, the grating pitch is not necessarily uniform across the grating, etc.) These grating-fabrication errors are averaged over the diameter of the beam incident on the grating and, therefore, the larger the spot size on the grating 324 (and, therefore, the larger the encoder head), the better the measurement system. At the same time there is always a trade-off caused by spatial limits/volume allowed to the encoder head as part of the overall exposure system (both for packaging and mechanical stability reasons). In reference to FIGS. 3A, 3B, 4, the proposed compact, small foot-print design easily accommodates a 5 mm diameter measurement beam 312, 312A, which, in comparison with, for example, a 1.7 mm diameter measurement beam, illuminates an 8.6 times larger an area on the grating 324. Accordingly, the contributions of imperfections of the grating 324 into the measurements are $\sqrt{8.6}$=2.94 times smaller than those that the encoder head limiting the measurement beam diameter to 1.7 mm would possess. At the same time, if a 5 mm beam were to be used with any type of encoder head of related art, the foot-print/size of the head would be approximately 2-to-3 times larger than the one discussed here.

Combination of Measurements of Transverse Displacement of the Workpiece-Stage and Sensitivity of the System to a Shift along the Z-axis.

The combination of measurement signals required to measure the displacements of the workpiece-stage along x-axis and z-axis can be described as:

$$M_{M+1} = 2x + Az + E_{fiber} \quad \text{Eq. (1)}$$

$$M_{M-1} = 2x + Bz + E_{fiber} \quad \text{Eq. (2)}$$

Here, $M_{M+1}$ and $M_{M-1}$ are measurements signals produced by the beams diffracted in the xz-plane and representing +1 and −1 orders of diffraction at the grating 324, respectively; x and z denote the positions of the workpiece-stage grating 324 (or workpiece-stage) with respect to the block 320 along x- and z-axes, respectively; A, B are coefficients; $E_{fiber}$ is a phase error term associated with two constituent heterodyne optical frequencies in the input beam 312, 312A. Note that sensitivities of M1 and M2 to a shift along the x-axis (transverse motion of the grating relative to the encoder head) have the opposite signs, while sensitivities of M1 and M2 to $E_{fiber}$ have the same signs.

Accordingly, the position of the workpiece-stage grating 324 along the z-axis with respect to the body of the encoder head is:

$$Z_{Meas\,X\,orders}=(M_{M-1}+M_{M-1}2LR)/(A+B)=[2x+Az+ E_{fiber}+-2x+Bz+E_{fiber}-2(E_{fiber})]/(A+B)=(A+B)z/ (A+B) \qquad \text{Eq. (3)}$$

Here, LR is a local reference associated with direct measurement of $E_{fiber}$.

When A+B, $$X_{Meas}=(M_{M+1}-M_{M-1})/4=[2x+Az+E_{fiber}-(-2x+Az+ E_{fiber})]/4 \qquad \text{Eq. (4)}$$

Figure 3D:
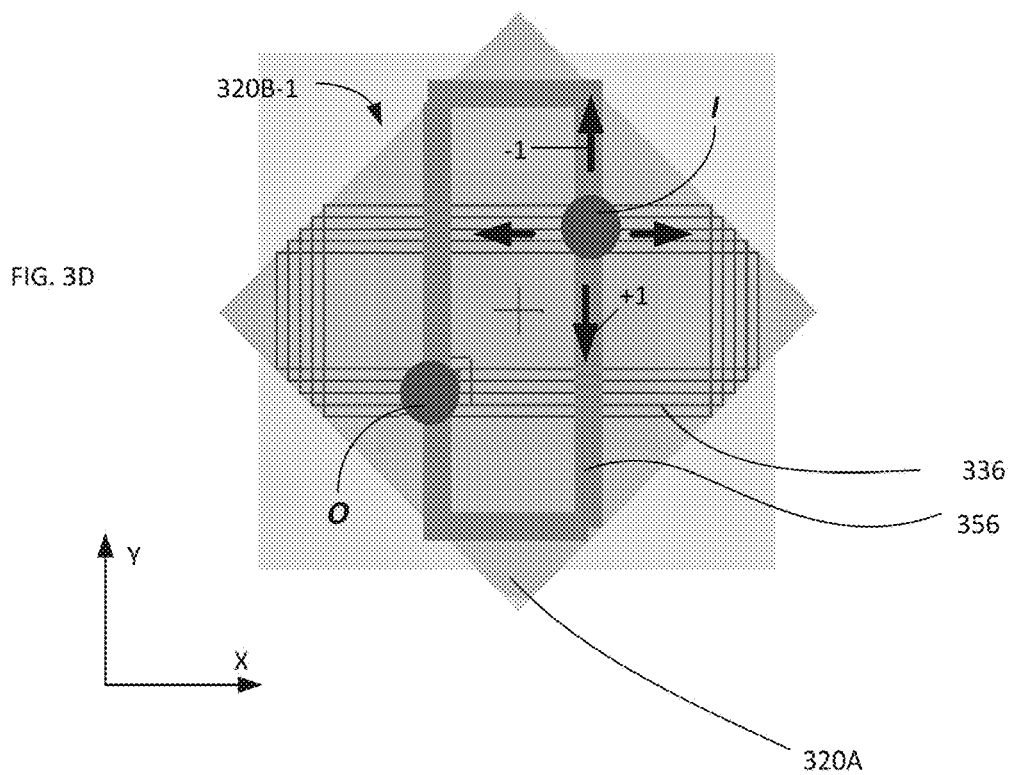

The same set of principles and design rules as those discussed in the example of the structure above (and configured for measurement of the displacement along the x-axis) can be generally followed with respect to the accommodation of input light that diffracts at the grating 324 in the yz-plane. Specifically, referring again to diffraction of the input beam 312A at the grating 324, FIG. 3D schematically illustrates, in top view, the paths of propagation of the measurement beams diffracted in the xz-plane (lines 336) and those representing orders of diffraction in the yz-plane (line 356). The reflections of light in both planes (xz-plane and yz-plane) occur at the roofs (formed by intersections of facets 320A with 320B1 and 320B-3) and internally (in a specific case—totally-internally) at the surfaces of side facets 320B-2, 320B-4.

Equations similar to those of Eqs. (1), (2), (3), and (4) express the results of the measurements of the workpiece-stage positions along the z- and x-axes based on the measurement beams diffracted in the yz-plane. The two measurement signals respectively corresponding to the +1 and −1 orders of diffraction in xz-plane (or yz-plane) are added together to obtain the corresponding measurement of the position of the workpiece-stage along the z-axis, while the difference between these measurement signals provides for the position along the x-axis (or y-axis). Because both measurement beams (one corresponding to the +1 order of diffraction formed at the 1st pass off of the grating 324 and another corresponding to the −1 order of diffraction formed at the 1st pass off of the grating 24) are incident on the same point/area on the grating 324 for both passes, these beams experience the same change in z-coordinate even if the grating 324 is not perfectly flat.

When the measurements are subtracted to obtain the x-displacement (as per Eq. (3)), such effects caused by the grating non-flatness cancel each other precisely. This is not the case in the encoder heads of the related art, where the $2^{nd}$ pass beams for the two measurements are spatially separated at the workpiece-stage grating. When the embodiment of the present invention is implemented, and for a 632.8 nm measurement beam and a grating pitch of 1 um, A=B=3.556 nm of phase change per 1 nm of shift along the z-axis, so the total measurement signal has a sensitivity of 7.112 nm/nm. The presence of two z-measurement signals (one resulting from the +1 and −1 order beams in the xz-plane and another resulting from the +1 and −1 order beams in the yz-plane) further increase the sensitivity of the embodiment of the present invention by a factor of 2, to about 14.224 nm/nm. This is more than 3 fold larger than the sensitivity characterizing the double-pass, normal incidence based measurement of the change of the z-position in an embodiment of the related art utilizing the corner-cube(s), which has approximately 4 nm/nm sensitivity.

A Multi-Axis Optical Metrology Sub-system.

Figure 6A:
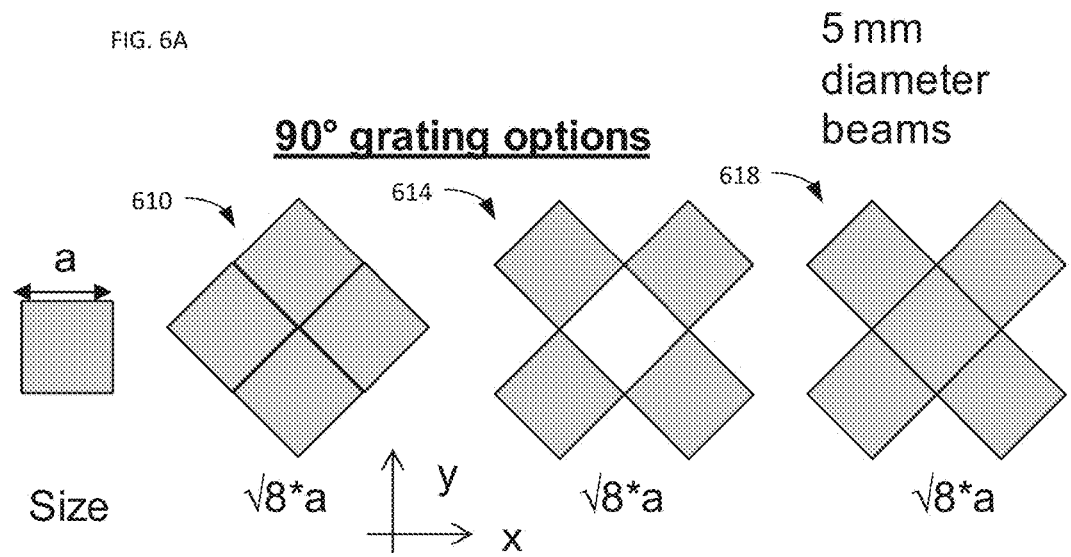
FIGS. 6A and 6B are schematics of various schemes of cooperation of multiple units of embodiments of the invention into a multi-encoder-head module for use with an exposure tool.
Figure 6B:
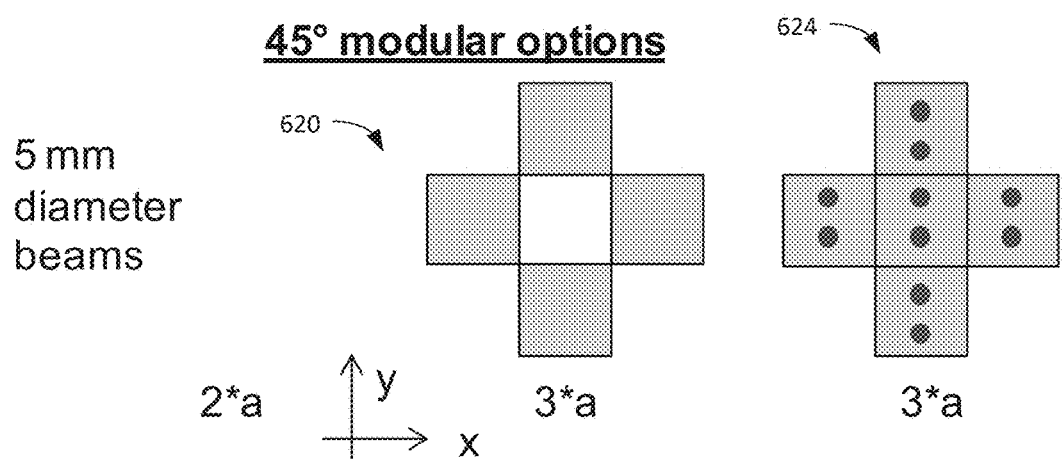

Complex contraptions configured around multiple frustrated single blocks similar to bock 320 can be employed to structure a multi-axis encoder head, as schematically illustrated in FIGS. 6A, 6B, where "a" is the side dimension of (a top surface 320A of) an individual block. In a "90-degree grating" option of FIG. 6A, the directions along the grooves or lines of the 2D workpiece-stage grating to be used with any of the combinations 610, 614, and 618 are aligned along the x- and y-axes. In a "45-degree grating" option of FIG. 6B, the directions along the grooves or lines of the 2D workpiece-stage grating to be used with any of the combinations 620, 624, 628 are aligned along the bisectors of the quadrants formed by x- and y-axes (that is, at +45 and −45 degrees to the x/y-axes).

In order to calibrate the z-measurements, three measurements may be required to be performed along a line (to measure the z-displacement of the workpiece-stage and tilt and the third one to map out any grating topography errors). This may be accommodated by a total of 5 glass block per module, as shown in case of contraptions 618 and 624.

Among the unsurpassed advantages provided by implementing an embodiment of the invention in a lithographic exposure tool become immediately apparent to a person of skill in the art, there is vastly reduced alignment and assembly time (as compared with a related art embodiment employing corner cubes), as the only coordination required between the workpiece-stage grating and the optical body of the encoder head is that between the grating and the frustrated single block 320 and not the four corner cubes.

Options for Formation of Reference Beams of Light

Figure 7:
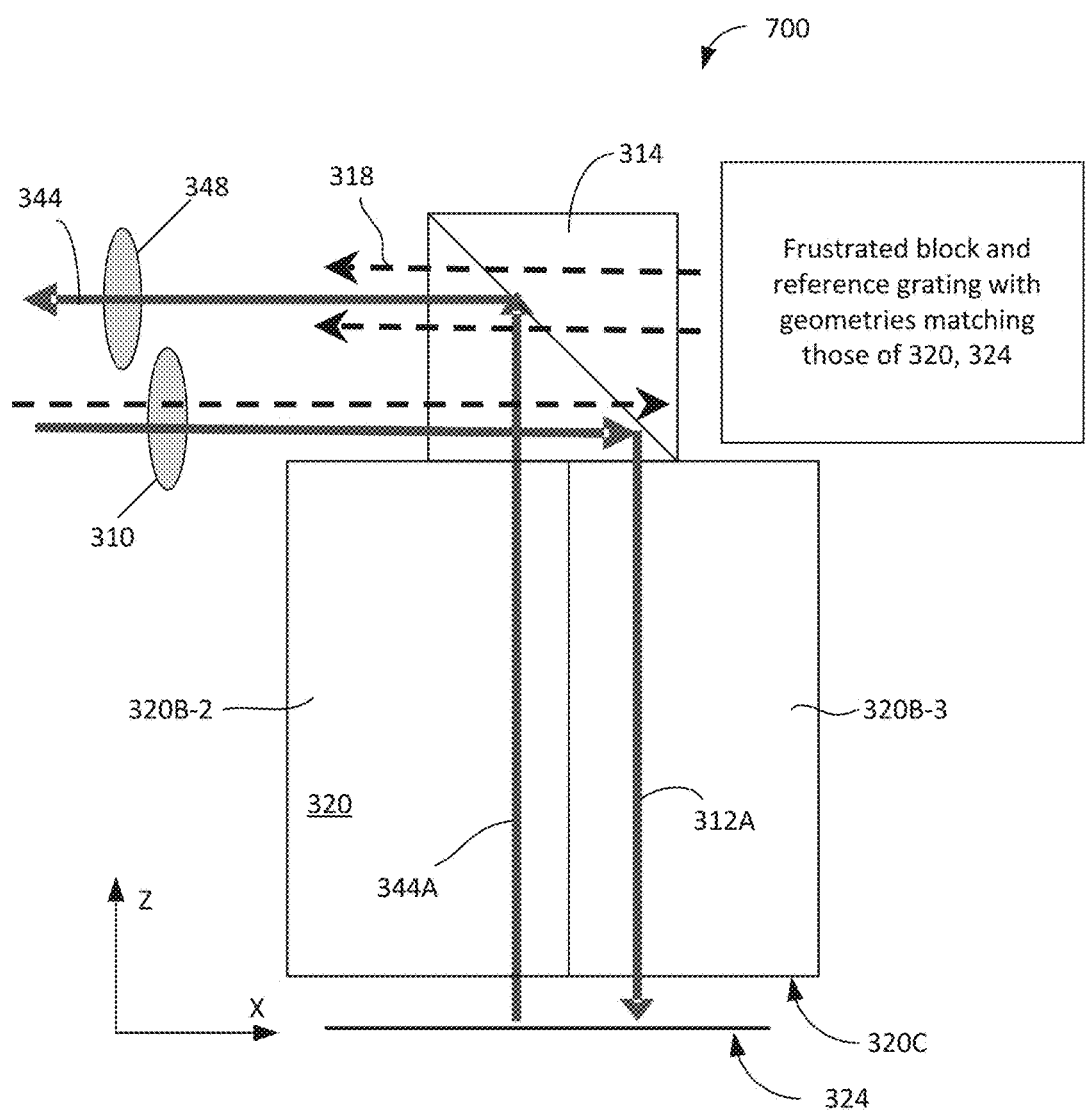
FIG. 7 shows an alternative arrangement for formation of reference beams in the embodiment of the invention.

There are several options for creating the reference beams of light in the encoder head of the invention (which in this case are beams of light that do not diffract off the measurement workpiece-stage grating 324). One of such options, involving the roof prism 316 has been described in relation to FIG. 3A. An alternative option would be to use a reference frustrated single glass block (having geometry substantially matching that of the measurement block 320) in combination with a reference grating (having grating geometry substantially matching that of the measurement grating 324), instead of the roof prism 316 with the reference grating, as shown schematically with 700 in FIG. 7.

Generally, the absolute angle tolerances for the fabrication of a frustrated single blocks are not required to be particularly tight, but the two blocks need to be substantially close to each other in their angles, in one embodiment to better than about 10 arc-seconds. One Risley pair of prisms can steer all four beams together, but the glass blocks must be fabricated well enough to ensure the measurement and reference beams are not tilted with respect to each other, maximizing signal contrast and measurement repeatability. (If the blocks don't match well, the measurement and reference beams may be tilted relative to each other, potentially causing tilt fringes and leading to lower signal contrast)

In a multi-module encoder head such as those depicted in FIGS. 6A, 6B, either one combination of reference glass block/grating can be used per measurement, alternatively, only one reference glass block can be used for entire encoder head (such as any of head 610, 614, 618, 620, 624). In the latter case, all of the individual measurement blocks must have the same angular parameters, and the reference is simply split by beamsplitters to be used with all the measurements. In different situations, the location(s) of the reference glass blocks can be different. A reference block can be placed, for example, next to, between, or above the frustrated single blocks used for measurements.

Non-Parallel Arrangement Between Top and Bottom Surfaces of a Frustrated Single Block.

Figure 8A:
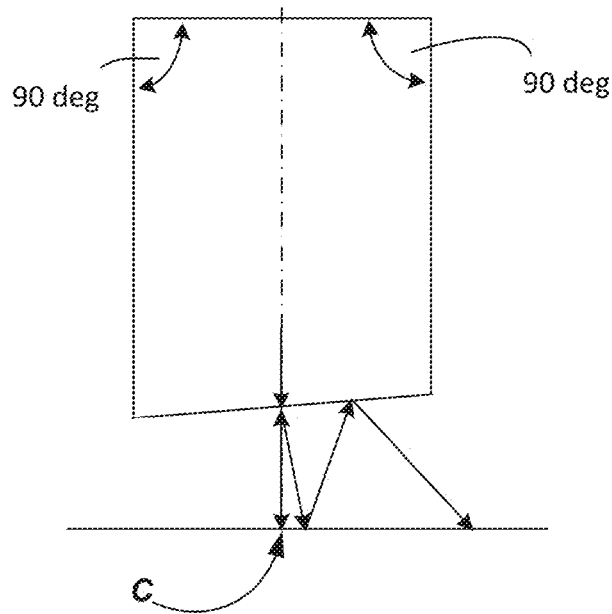
FIGS. 8A and 8B provide schematic comparison between different geometries of a glass block in reference to the underlying surface.
Figure 8B:
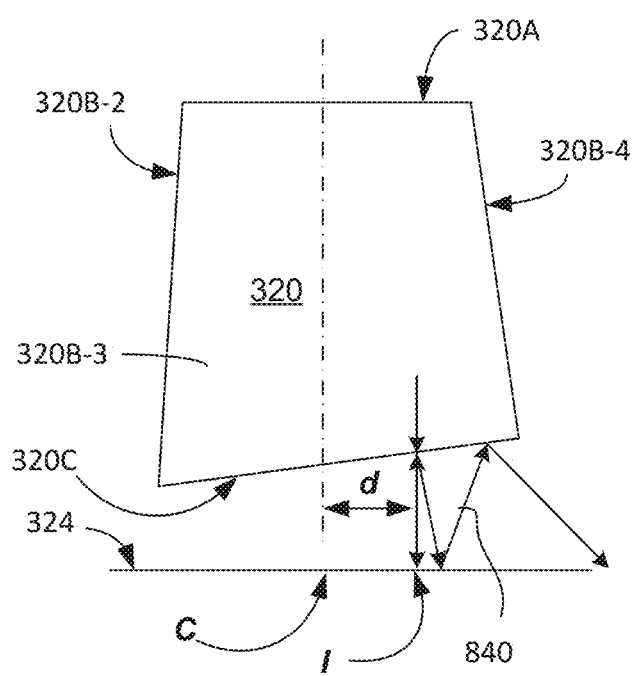

As was alluded to above, and in reference to FIG. 8B, the bottom surface may be made angularly inclined and non-parallel with respect to the top surface 320A to walk-off (as shown by arrows 840) the beam of light representing the 0th order of diffraction as a result of multiple reflections outside of the block 320 and to prevent the stray-light problems (caused by the zeroth order of diffraction formed at the grating 324) and to increase the SNR of the measurements. In comparison with a seemingly similar situation of FIG. 8A (also addressed earlier in reference to FIG. 2D) of related art, however, where the mutual positioning of the side and upper surfaces of the block of glass is understandably not frustrated and forms substantially ideal 90-degree corners, the embodiment of the present invention provides unexpected advantages stemming from frustrated retroreflection of light beams internally to the block, as was already referred to above.

Indeed, the embodiment of FIG. 8A necessarily employs the measurement beam incident onto the center C of the diffractions grating, which separates the input measurement beam into four second-pass diffracted measurement beams directed back to the encoder head. There are several disadvantages in such configuration employed by related art. First, for a given glass block size, the allowable beam size is about 2× smaller (resulting in smaller averaging of grating defects). Second, the $2^{nd}$ pass beams are not incident on the same places on the grating, which leads to sensitivity in the x- and y-measurements to grating non-flatness issues. Third, the use of 'perfect' retroreflecting corners of the glass block of the related art inevitably leads to parallel stray light within the encoder-head optical system, primarily but not exclusively due to the 0-order diffracted beams making multiple passes through the encoder head. Fourth, the four spatially separated output measurement beams means that four lens/fiber combinations are required to properly output all of the measurement signals, in disadvantageous contradistinction with the (one output lens element—one output optical fiber) of the present design, which relies in relevant part on the transverse shift d of the input measurement beam with respect to the center of the encoder-head optical system, as discussed in reference to FIGS. 3A, 3B.

Overall, it is appreciated that, while the typical encoder head design that employs corner-cube feature and/or elements (whether stand-alone ones or those forming integral part(s) of a bigger optical component) and is dedicated to effectuate the same measurement as an embodiment of the invention, such design requires a multiplicity of (sometime, a hundred or more) pieces of glass (prisms and lenses) and/or complex alignment with respect to a chosen reference, to be constructed. With the use of a concept of the invention, the same operational effect is achieved while implementing fewer than 20 or so optical pieces. The material cost is reduced, but so is the assembly cost. Also, there are very few Risley prism adjustments needed, as the optics used cannot introduce angle errors between the beams. Embodiments of the invention provide, at lower cost, a. simple alternative to the current encoder head designs.

It is appreciated that some of the steps of the embodiments of the method of the invention can be effectuated with a processor controlled by instructions stored in a tangible, non-transitory storage memory. The memory may be random access memory (RAM), read-only memory (ROM), flash memory or any other memory, or combination thereof, suitable for storing control software or other instructions and data. Some of the functions performed by the processor have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

References made throughout this specification to "one embodiment," "an embodiment," "a related embodiment," or similar language mean that a particular feature, structure, or characteristic described in connection with the referred to "embodiment" is included in at least one embodiment of the present invention. Thus, appearances of these phrases and terms may, but do not necessarily, refer to the same implementation. It is to be understood that no portion of disclosure, taken on its own and in possible connection with a figure, is intended to provide a complete description of all features of the invention.

It is also to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed.

The invention as recited in claims appended to this disclosure is intended to be assessed in light of the disclosure as a whole, including features disclosed in prior art to which reference is made.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

While the invention is described through the above-described exemplary embodiments, it will be understood by those of ordinary skill in the art that modifications to, and variations of, the illustrated embodiments may be made without departing from the inventive concepts disclosed herein. Disclosed aspects, or portions of these aspects, may be combined in ways not listed above. Accordingly, the invention should not be viewed as being limited to the disclosed embodiment(s).

The invention claimed is:

1. An optical system configured to transmit an input light beam therethrough towards a workpiece being measured and to form a return light beam upon interaction of light from the input light beam with a diffraction grating associated with the workpiece,
   the optical system comprising a single block of optical material positioned
      to transmit a portion of said input beam that is delivered to the diffraction grating while, at the same time, not retroreflecting light incident onto a corner of said block internally, and
      to form, in conjunction with said diffraction grating, four spatially-distinct measurement beams required for determination of a change of orientation of the workpiece with respect to the single block,
   the optical system being devoid of an individual stand-alone optical corner cube disposed in optical communication with the diffraction grating.

2. An optical system according to claim 1, wherein said four spatially-distinct measurement beams include
   (i) first and second beams diffracted at the diffraction grating in a first plane that contains an axis along which said portion of the input light beam propagates through the single block and
   (ii) third and fourth beams diffracted at the diffraction grating in a second plane that contains said axis, wherein the first and second plane are transverse to one another.

3. An optical system according to claim 1, wherein the single block is a frustrated cuboid having an input planar facet disposed perpendicularly to said portion of the input light beam.

4. An optical system according to claim 3, wherein the single block has a first facet that is transverse to the input planar facet, and wherein said first facet is not perpendicular to the input planar facet.

5. An optical system according to claim 4, wherein the single block has a second facet that is transverse to both the input planar facet and the first facet, and wherein the second facet is perpendicular to the input planar facet.

6. An optical system according to claim 3, wherein the single block has a first facet that is transverse to the input planar facet and a second facet that is transverse to the input planar facet, the second facet being opposite to the first facet, said first and second facets being not parallel to one another.

7. An optical metrology tool comprising the optical system according to claim 1, wherein the workpiece includes at least one of a moveable stage, a substrate, a flat panel, and a display.

8. An optical imaging system comprising an optical metrology sub-system and configured to form an image of a chosen object at the workpiece, said optical imaging system comprising the optical system according to claim 1, said optical system configured as a portion of said optical metrology sub-system.

9. An optical system configured to transmit an input light beam therethrough towards a workpiece and to form a return light beam upon interaction of light from said input light beam with a diffraction grating associated with the workpiece, the optical system comprising:
   an optical beamsplitter having an input side and first and second planar output sides;
   a single frustrated cuboid having an input planar facet disposed parallel to the first planar output side to receive a first portion, of the input light beam, that has traversed the input side and the first planar output side of the optical beamsplitter; and
   a single reference optical element configured to receive a second portion, of said input light beam, that has traversed the input side and the second planar output side of the optical beamsplitter.

10. An optical system according to claim 9, comprising a first diffraction grating between the second planar output side and the single reference optical element, the single reference optical element configured to redirect a diffracted beam, formed at the first diffraction grating from said second portion, through the second and first planar output sides.

11. An optical system according to claim 9, wherein the single frustrated cuboid is spatially coordinated with the beamsplitter to receive the first portion of the input light beam at a point that is shifted, in the input planar facet, from a center of the input planar facet to form said return light beam.

12. An optical system according to claim 11,
wherein the single frustrated cuboid has a first side facet that is transverse to the input planar facet, and a second side facet that is transverse to the input planar facet and opposite to the first side facet,
wherein the first side facet is the closest, among side facets of the block, to said point, and
wherein at least one of the first and second side facets is tilted with respect to an axis that lays in a plane of said at least one of the first and second side facets.

13. An optical system according to claim 9, further comprising
a light access unit having an input optical aperture that is configured to deliver the input light beam to said single frustrated cuboid through the optical beamsplitter, and
an output optical aperture configured to receive the return light beam from said cuboid through the optical beamsplitter,
wherein said input and output optical apertures are defined by end facets of respectively corresponding input and output optical fibers immovably affixed in the light access unit.

14. An optical imaging system comprising an optical metrology sub-system and configured to form an image of a chosen object at the workpiece, said optical imaging system comprising the optical system according to claim 9, said optical system configured as a portion of said optical metrology sub-system.

15. An optical system configured to transmit an input light beam therethrough towards a workpiece and to form a return light beam upon interaction of light from said input light beam with a diffraction grating associated with the workpiece, the optical system comprising:
a light access unit defining input optical apertures and output optical apertures in a plane of the light access unit;
an optical beamsplitter having
an input side substantially parallel to said plane and first and second output sides,
wherein the optical beamsplitter is configured to spatially separate the input light beam, which is directed from an input optical aperture and that traverses the input side, into a reference beam and a measurement beam;
a first single block of optical material positioned to receive light from the measurement beam from the optical beamsplitter and return light from the measurement beam to an output optical aperture, from the output optical apertures, through the optical beamsplitter while not retroreflecting said light from the measurement beam internally to the first single block; and
a second single block of optical material disposed to receive the reference beam.

16. An optical system according to claim 15,
wherein said first single block is a single frustrated cuboid spatially coordinated with said optical beamsplitter to receive the measurement beam at an input point of an upper surface of the cuboid, the input point of said upper surface being laterally shifted from a center of the upper surface.

17. An encoder head according to claim 16,
wherein said single frustrated cuboid has a first side facet that is transverse to the upper surface, and a second side facet that is transverse to the upper surface and opposite to the first side facet,
wherein the first side facet is the closest, among side facets of said cuboid, to the input point, and
wherein at least one of the first and second side facets is tilted with respect to an axis located in a plane of said at least one of the first and second side facets.

18. An encoder head according to claim 16, wherein said input point is laterally separated from said center to form said return light beam.

19. An encoder head according to claim 15,
wherein said input and output optical apertures are formed by end facets of respectively corresponding input and output optical fibers that are immovably affixed in said light access unit.

20. An encoder head according to claim 15, further comprising a diffraction grating disposed across the reference beam and located between the optical beamsplitter and the first single block of material.

21. An optical imaging system comprising an optical metrology sub-system and configured to form an image of a chosen object at the workpiece, said optical imaging system comprising the optical system according to claim 16, said optical system configured as a portion of said optical metrology sub-system.

* * * * *